United States Patent [19]
Furkert

[11] 3,761,575
[45] Sept. 25, 1973

[54] PROCESS FOR THE CRACKING OF AMMONIUM SULFATE

[75] Inventor: Herbert Furkert, Grosskonigsdorf, Germany

[73] Assignee: Chemiebau Dr. A. Zieren GmbH & Co. KG, Cologne, Germany

[22] Filed: Mar. 3, 1972

[21] Appl. No.: 231,533

[30] Foreign Application Priority Data
Mar. 3, 1971 Germany .................. P 21 10 036.7

[52] U.S. Cl. .................. 423/356, 423/520, 423/541
[51] Int. Cl. ........ C01c 1/02, C01c 1/24, C011 17/50
[58] Field of Search ................. 423/356, 541, 542, 423/520, 351, 522; 23/193, 177 R

[56] References Cited
UNITED STATES PATENTS
3,383,170  5/1968  Furkert et al. ................ 423/356

FOREIGN PATENTS OR APPLICATIONS
1,467,005  10/1969  Germany ................. 23/177 R
1,199,243   8/1965  Germany ................. 23/177 R Primary Examiner—Oscar R. Vertiz
Assistant Examiner—Hoke S. Miller
Attorney—I. William Millen et al.

[57] ABSTRACT

For converting ammonium sulfate into ammonia and sulfur dioxide, the steps of: (a) heating ammonium sulfate to 300°–500° C. to produce ammonia and ammonium bisulfate; and (b) burning resultant ammonium bisulfate at 850°–1,250° C. with a carbon-containing fuel and sufficient oxygen to maintain the gases exiting from the combustion chamber, at an oxygen concentration of between 1 and 8% by volume.

14 Claims, 2 Drawing Figures

FIG. I

PROCESS FOR THE CRACKING OF AMMONIUM SULFATE

CROSS-REFERENCED TO RELATED APPLICATION

An application related to this invention is applicant's application entitled PROCESS FOR THE COMBUSTION OF AMMONIUM SULFATE filed Feb. 22, 1972, bearing Ser. No. 228,258, based on West German Patent Application P. 21 07910.7, filed Feb. 19, 1971, and the contents of this application being incorporated by a reference herewith.

BACKGROUND OF THE INVENTION

This invention relates to a process for the cracking of ammonium sulfate into ammonia and sulfur dioxide.

A number of chemical processes, for example, the preparation of $\epsilon$-caprolactam from cyclohexanone oxime, yield a substantial quantity of by-product ammonium sulfate, for which there is no use of economic significance. As a fertilizer, ammonium sulfate has only a limited value, especially since the waste product, in most cases, would first have to be purified for fertilizer purposes.

It is known from U. S. Pat. No. 3,383,170 that ammonia can be liberated from ammonium sulfate at 200°–450° C. leaving ammonium bisulfate as a residue. The thus-obtained ammonium bisulfate can then be converted into sulfur dioxide and ammonium sulfate by reduction with sulfur, hydrogen sulfide, or hydrogen, at about 400°–550° C. Although almost all the ammonia is recovered in this process, it is necessary to employ for the reduction either relatively expensive hydrogen, or, when using sulfur or hydrogen sulfide as the reducing agent, a greater amount of sulfuric acid must be produced than can be recycled into the preceding process stage yielding ammonium sulfate. The amount of ammonium sulfate unavoidably produced would then only be replaced by an excess production of sulfuric acid, which frequently is undesirable.

U. S. Pat. No. 3,359,069 and German Patents 1,199,243 and 1,206,404 describe the thermal decomposition of a waste liquor comprising sulfuric acid containing ammonium salts such as ammonium sulfate at temperatures of above 900° C. In this process, the ammonium ion dissolved in the acid is essentially converted to nitrogen and water, so that an $SO_2$-containing gas is produced which is practically free of nitrogen oxide. This process is suitable, for example, for the combustion of waste liquors such as the residual sulfuric acids obtained in the manufacture of acrylates which contain organic as well as inorganic ammonium salts.

In German Patent Application P 2,107,910.7, corresponding to the cross referenced U. S. application filed Feb. 22, 1972, it has also been suggested to burn solid, finely divided ammonium sulfate at temperatures of between 800° and 1,250° C. together with a carbon-containing fuel to form sulfur dioxide, steam, and nitrogen. In this process, there is a loss of ammonia due to combustion, so this process is particularly applicable where primary importance is placed on the recovery of the sulfur contained in the ammonium sulfate.

SUMMARY OF THE INVENTION

It is an object of the present invention to provide a process for cracking ammonium sulfate which may be contaminated in order to recover the sulfur content and up to 50 percent of the ammonia content. In particular, the novel cracking process is to serve for supplying the sulfuric acid requirement and for partially supplying the ammonia requirement of an ammonium sulfate producing chemical process stage preceding this cracking process without having to discharge an excess of sulfuric acid from the cracking process.

Upon further study of the specification and appended claims, further objects and advantages of this invention will become apparent.

The above objects are attained by the process of the invention comprising: (a) heating the ammonium sulfate to a temperature of between 300° and 500° C. to form ammonia and ammonium bisulfate; and (b) burning the ammonium bisulfate at temperatures of between 850° and 1,250° C. with a carbon-containing fuel, maintaining, in the gases exiting from the combustion chamber, an oxygen concentration of between 1 and 8 percent by volume.

The ammonium sulfate is accordingly split, in a first stage, into ammonia and ammonium bisulfate. The split-off ammonia can also be utilized for the neutralization of the mixture obtained during the Beckmann rearrangement for the formation of $\epsilon$-caprolactam. The liberation of the ammonia takes place preferably in the temperature range of 350°–450° C. in the presence of an excess of ammonium bisulfate. Thus, the ammonium sulfate to be dissociated is mixed with a preferably agitated ammonium bisulfate melt, the latter being maintained at a temperature within the aforementioned range; during this step, $NH_3$ is spontaneously formed. The steady state molar ratio of ammonium sulfate to bisulfate in a continuous process is generally about 0.01:1 to 0.1:1, preferably about 0.02:1 to 0.085:1, respectively. The $NH_3$ formation can be accelerated by an entraining agent, for example steam or nitrogen. For the complete splitting off of $NH_3$, it is preferred to conduct same in a column into which the ammonium bisulfate melt, laden with ammonium sulfate, is introduced. The entraining agent flows upwardly in the column and entrains the split-off ammonia overhead.

The ammonium bisulfate melt exiting from the column is partially, preferably about 10 to 50 percent, reintroduced into the splitting stage, and the remainder fed to the subsequent combustion stage. The burning of the ammonium bisulfate is conducted with the aid of a carbon-containing fuel, for example, fuel oil or natural gas. It is essential that an oxygen concentration of between 1 and 8 percent by volume be maintained at the outlet of the combustion chamber, so that the occurrence of ammonia or nitrogen oxides in the combustion gas is avoided. The thus-formed combustion gas can be further processed in a suitable manner, for example by the contact process to concentrated sulfuric acid or oleum.

Preferably, the liquid ammonium bisulfate is introduced into the combustion chamber via nozzles. The fine bisulfate droplets are vaporized; and the resultant bisulfate vapors are burned in the combustion zone proper.

In accordance with a preferred embodiment of this invention, the ammonium bisulfate is burned at a temperature of between 950° and 1,150° C. At this temperature range, the combustion takes place at optimum speed without there being a marked amount of ammonia or nitrogen oxides present in the combustion gas. Suitably, an oxygen concentration of between 1.8 and 4.5 percent by volume is maintained in the gases exiting from the combustion chamber.

If the $SO_2$-containing gas obtained by the combustion is insufficient to supply the sulfuric acid requirements of the preceding process step, it is possible to burn sulfur simultaneously within the combustion chamber. Alternatively, however, any sulfur deficiency is preferably compensated for by burning a sulfur-containing fuel, e.g. a sulfur-containing fuel oil having a known and sufficient quantity of sulfur.

When an ammonium sulfate-yielding process step yields, in addition, an ammonium sulfate solution contaminated by organic substances, this solution can be burned together with the ammonium bisulfate. Also other sulfur-containing waste substances can be concomitantly burned, for example, organic compounds and/or waste sulfuric acids containing ammonium salts, as they are produced, for example, in the manufacture of methyl methacrylate or other acrylates.

DESCRIPTION OF PREFERRED EMBODIMENTS

Figure 1:
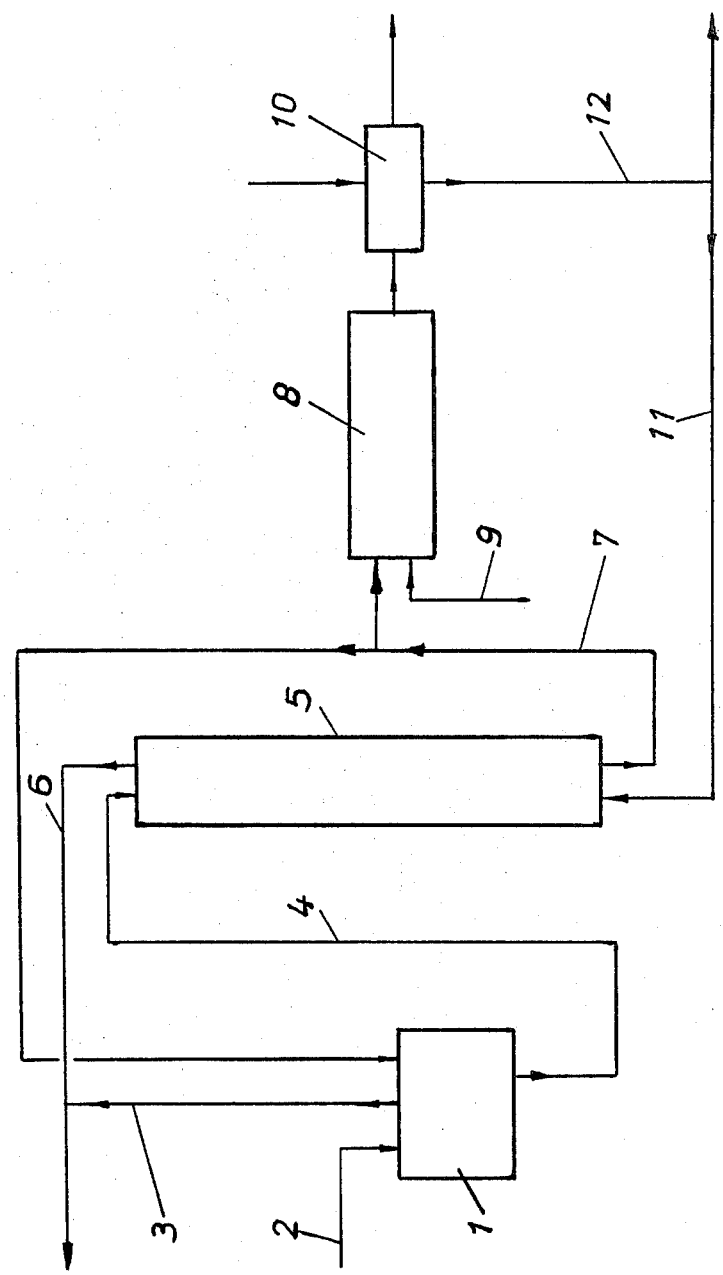
FIG. 1 is a flow chart of a first embodiment of the process of this invention utilizing a two-stage ammonia splitting system.

According to FIG. 1, solid ammonium sulfate, fed via conduit 2, is mixed with a melt of ammonium bisulfate in a mixer 1, an agitated vessel, for example. The thus-introduced ammonium sulfate is partially decomposed, so that ammonia escapes from the mixer via conduit 3. The ammonium bisulfate melt, containing ammonium sulfate, is pumped from the mixer 1 via conduit 4 to a column 5 and treated therein counter-currently to superheated steam. The ammonia-containing steam escaping overhead of the column 5 through conduit 6 is combined with the ammonia discharged from mixer 1 and is optionally available, after condensation of the steam, for use in a preceding process stage.

The melt discharged from the column 5, consisting essentially only of ammonium bisulfate, is partially pumped back into the mixer 1 via conduit 7. A portion of the ammonium bisulfate melt corresponding to the amount of ammonium sulfate fed thereto is burned, in the combustion furnace 8, with the aid of a sulfur-containing fuel oil fed at 9, to an $SO_2$-containing gas which, after passing through the waste heat boiler 10, is available, for example, as a starting gas in the contact process for the manufacture of sulfuric acid. The superheated steam produced in the waste heat boiler 10 is fed in part via conduit 11, to the column 5 as an entraining agent, and the other part is available for other purposes at 12, e.g. for the production of electricity or for heating purposes.

Figure 2:
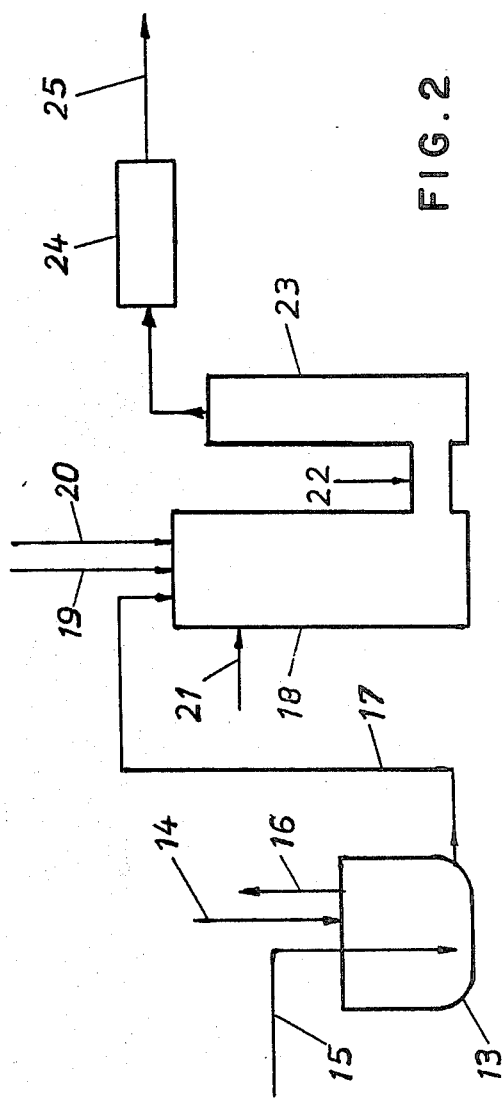
FIG. 2 is a flow chart of a second embodiment of the process of this invention employing a one-stage ammonia splitting system.

In the embodiment according to FIG. 2, the ammonium sulfate is fed, via conduit 14, to an agitated vessel 13 containing an ammonium bisulfate melt. Nitrogen is introduced under pressure through conduit 15 into the vessel 13 as an entraining agent. A mixture of $N_2$ and $NH_3$ escapes from the vessel via conduit 16. The ammonium bisulfate melt, containing ammonium sulfate, is pumped, from the vessel 13 through conduit 17 and passes to a main combustion chamber 18, where it is introduced via nozzles. Simultaneously, molten sulfur and an organically contaminated $(NH_4)_2SO_4$ solution are introduced via nozzles at 19 or 20 into the chamber 18. The fuel oil and the air are fed laterally to the main combustion chamber 18 at 21. The combustion mixture is entirely burned up, after the addition of air at 22, in an afterburning chamber 23. The $SO_2$-containing gas after transferring to heat in a waste heat boiler 24, is available for the contact oxidation.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Referring to FIG. 1, into an agitated vessel (1) containing a molten mixture of ammonium sulfate and ammonium bisulfate, these are introduced via conduit 2, 132 kg. per hour of solid $(NH_4)_2SO_4$ per about 400 kg. of melt. The melt is maintained at about 390° C. by heating with steam. During this treatment, 13.3 Nm³/hr. of ammonia escapes via 3 from the vessel. (Also escaping a steam derived from water or humidity adhering to the incoming salt.) The melt in conduit 4 which still contains $(NH_4)_2SO_4$ is then pumped to the packed column (5) and contacted directly therein at 380°–400° C. with superheated steam. Together with the steam, about 8.4 Nm³/hr. of ammonia escapes via conduit 6 from the column. The ammonia-steam mixture is combined with the ammonia from the agitated vessel (1) and is available, for example, for the neutralization of the rearrangement mixture of the ε-caprolactam production stage.

About 115 kg. per hour of the ammonium bisulfate melt discharged from the column (5) via conduit 7 and still containing about 1.9 percent by weight of $(NH_4)_2SO_4$, is introduced via nozzles into the furnace (8), the latter having a temperature of 1,060° C. For the compensation of sulfur losses, about 0.8 kg. per hour of sulfur is concomitantly burned. The sulfate combustion requires 17.6 kg. of fuel oil (introduced at 9) with a heating value of 10,000 kilocalories per kg. On an hourly basis, 350 Nm³ of combustion gas leaves the furnace at 1,040° C. This gas contains 6.1% by volume of $SO_2$, 0.3% by volume of $SO_3$, 24.8% by volume of $H_2O$, 5.9% by volume of $CO_2$, 58.6% by volume of $N_2$, and 4.3% by volume of $O_2$. In a large-scale technical plant, a waste heat boiler (10) can be connected after the combustion furnace wherein, per ton of $(NH_4)_2SO_4$ to be processed, about 1.12 tons of steam (55 atmospheres gauge) is produced. The combustion gas can be further processed to sulfuric acid in a conventional manner.

EXAMPLE 2

Referring to FIG. 2, into a flame-heated kettle (13), 132 kg. of solid $(NH_4)_2SO_4$ is charged per hour onto 500 kg. of melt comprising predominantly of ammonium bisulfate, ammonium pyrosulfate, and a small amount of ammonium sulfate. The temperature of the melt is maintained at 395° C. To promote the separation of the ammonia, nitrogen is introduced as an entraining agent; this nitrogen leaves the vessel, mixed with about 16 kg. of $NH_3$.

A pump conveys, per hour, about 116 kg. of melt which still contains 6.7% of $(NH_4)_2SO_4$ into the main combustion chamger (18) of a furnace. Additionally introduced into the furnace are 26 kg. of 50% aqueous $(NH_4)_2SO_4$ solution, contaminated with organic substances; 0.8 kg. of molten sulfur; and 22 kg. of heavy fuel oil having a calorific value of 10,000 kcal/kg. Conventional devices are employed for the atomization of the liquids, which devices are adapted to the characteristics of the substances.

The gas produced by the combustion and reduction processes enters the afterburning chamber (23) at about 1,050° C. Insofar as necessary, secondary air can be added in order to complete the oxidation processes at about 950° C. Per hour, there exits from the furnace 443 Nm³ of gas containing 5.3% by volume of $SO_2$ and 26.4% by volume of $H_2O$. The $SO_2$ is further processed to sulfuric acid after optionally being cooled in a conventional manner to produce superheated steam.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for cracking ammonium sulfate into ammonia and sulfur dioxide, comprising the steps of: (a) heating ammonium sulfate to 300°–500° C. to produce ammonia and ammonium bilsufate; and (b) burning resultant ammonium bisulfate melt at 850°–1,250°C. with a carbon-containing fuel and sufficient oxygen to maintain the gases exiting from the combustion chamber, at an oxygen concentration of between 1 and 8 percent by volume.

2. The process according to claim 1, wherein said ammonium bisulfate is burned by introducing said ammonium bisulfate in the liquid state through nozzles into a combustion zone.

3. The process according to claim 1, wherein said ammonium bisulfate is burned at 950°–1150° C.

4. The process according to claim 1, wherein said gases exiting from the combustion chamber have an oxygen concentration of between 1.8 and 4.5 percent by volume.

5. The process according to claim 1 further comprising adding sulfur during the step of burning ammonium bisulfate.

6. The process according to claim 1, wherein said ammonium bisulfate is burned containing up to 11.5 parts by weight ammonium sulfate based on 100 parts ammonium bisulfate.

7. The process according to claim 1, wherein said process is continuous and in step (a) a steady state molar ratio of ammonium sulfate to ammonium bisulfate of 0.01:1 to 0.1:1, respectively, is maintained.

8. The process according to claim 7, wherein the molar ratio is 0.02:1 to 0.085:1.

9. The process according to claim 7, wherein ammonium sulfate is continously added to an agitated melt containing said ammonium sulfate and ammonium bisulfate.

10. The process according to claim 7, wherein 10–50 percent of the ammonium bisulfate produced in step (a) is recycled to step (a).

11. The process according to claim 1, wherein the ammonium bisulfate melt obtained from step (a) is treated with superheated steam to remove ammonia therefrom.

12. The process according to claim 10, wherein the ammonium bisulfate melt obtained from step (a) is treated with superheated steam to remove ammonia therefrom.

13. A process as defined by claim 1, wherein a stream of nitrogen or superheated steam is employed in step (a) to entrain the ammonia formed.

14. A process for cracking by-product ammonium sulfate from the production of ε-caprolactam by Beckmann rearrangement of cyclohexanone oxime, into ammonia and sulfur dioxide, comprising the steps of:
   a. heating the by-product ammonium sulfate to 300°–500°C to produce ammonia and ammonium bisulfate;
   b. neutralizing the mixture obtained during said Beckmann rearrangement with ammonia formed in (a) and
   c. burning resultant ammonium bisulfate melt at 850°–1,250°C with a carbon-containing fuel and sufficient oxygen to maintain the gases exiting from the combustion chamber, at an oxygen concentration of between 1 and 8 percent by volume.

* * * * *